United States Patent Office 3,257,471
Patented June 21, 1966

3,257,471
DDT DERIVATIVES
Douglas J. Hennessy, 47 Garyson Place, Teaneck, N.J.
No Drawing. Filed Sept. 27, 1960, Ser. No. 58,656
3 Claims. (Cl. 260—649)

This invention relates to certain o-halogenated DDT derivatives which are particularly useful as insecticides against DDT-resistant flies.

The discovery of the insecticidal effect of DDT on various insects was a great step forward in the insecticidal art. However, with the continuous use of DDT it was soon found that strains of insects soon developed which were resistant to DDT. These insects had the ability to detoxicate the DDT so that it was no longer effective as an insecticide against these insects.

Considerations based on chemical theory and on experimental analogy as well as on actual chemical experimentation point to the tertiary carbon-hydrogen bond as a chemically reactive structural feature in the molecule of DDT and its analogs. It appeared, therefore, that if by some means this bond could be rendered less susceptible to chemical reaction, the detoxication process mentioned above, insofar as it is a chemical reaction initiated at the tertiary carbon-hydrogen bond, might be minimized or even completely excluded. The first indication that this supposition had merit came in a study of the toxicity of d-DDT and some of its analogs which were synthesized so as to have deuterium in place of hydrogen at the tertiary carbon atom:

(I)
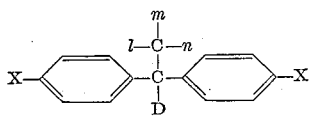

The $LD_{50}$ of each of the deuterated compounds for houseflies was found to be about one-half that of their non-deuterated analogs. This points to the essential implication of the tertiary carbon-hydrogen bond in the detoxication reaction. The well known isotope rate effect predicts that under certain kinetic conditions the deuerated analog will react less rapidly and therefore will be detoxified to a lesser extent. This accounts for the observed lower dosage requirement for lethality when the deuterated pesticide was used.

The effect of sterichindrance upon the rate of reactions is a matter of general knowledge to organic chemists. The introduction of substituents in the positions ortho to the point of attachment of the tertiary aliphatic carbon sterically hinders reactions which take place at this tertiary carbon-hydrogen group. There are four such ortho positions (*) available:

(II)
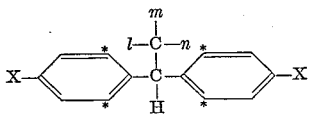

It appears from the prior art, however, that the introduction of such ortho substituents seriously diminishes the toxicity to pests of the resulting compound.

The present invention provides a class of DDT related derivatives which are effective against DDT-resistant insects and in which the toxicity is not seriously diminished.

It is accordingly an object of the present invention to provide a compound related to DDT which is not readily detoxicated by DDT-resistant insects and which does not have its general toxicity diminished.

It is a further object of the present invention to provide a process for killing insects by means of the above-mentioned compounds related to DDT.

It is still a further object of the present invention to provide a process for the preparation of the above-mentioned compounds related to DDT.

Other and more detailed objects will be apparent from the following description and claims.

The compounds of the present inventions may be described by the formula (III)
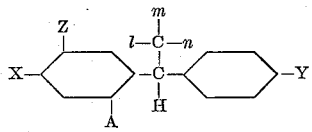

wherein X and Y are contactophore groups, A is a halogen having an atomic number below 36, Z is selected from the group consisting of hydrogen and substituents capable of modifying the effect on the dipole moment brought about by the introduction of the substituent A into the molecule; $l$, $m$ and $n$ are groups which do not deleteriously affect the toxicity of the compound toward insects.

It is to be understood that although X and Y are used in the above Formula III to designate the contactophore groups, they each may represent the same contactophore group or each may represent a different contactophore group. $l$, $m$ and $n$ may represent a variety of substituents which lend toxicity to the compound as against insects or do not diminish the toxicity of the compound as compared with the tri-chlorinated derivative. A variety of such substituents are well known to those skilled in the art. However, in the preferred form of this invention, $l$, $m$ and $n$ will represent chlorine atoms. Typical examples of compounds falling within the invention are given below. In these examples the substituent in the ortho position of the benzene ring I is either fluorine, chlorine or bromine; whereas the other substituents may be fluorine, chlorine, bromine, methyl or methoxy:

(IV)
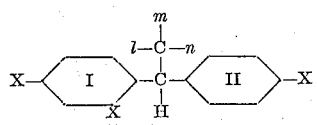

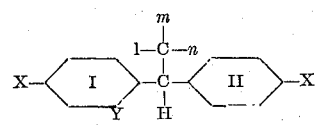

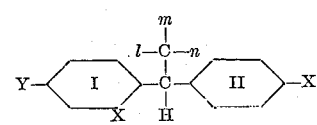

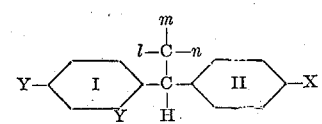

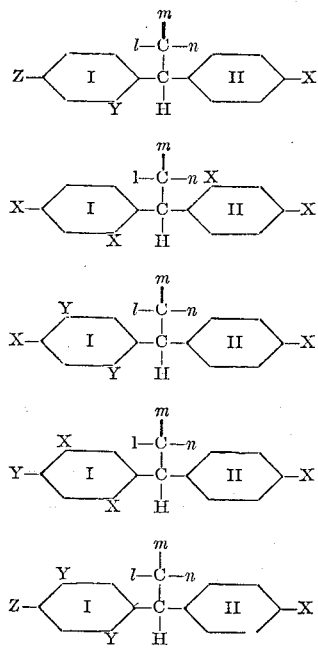

The novel feature common to all these compounds is that they have both benzene rings substituted in para position by substituents which are known to confer toxicity. (These are from among the group F, Cl, Br, Me, OMe, the so-called contactophores or auxocontacts.) Moreover, while the one ring has no further substitution, the other ring has one additional substituent placed in the position ortho to the attachment of the aliphatic tertiary carbon which is selected from the group consisting of F, Cl, and Br. This same ring may also have an additional substituent placed in position 5 where the substituent previously designated as being in ortho is shown in position 2 and the substituent previously designated as being in para is shown in position 4. The function of this additional substituent placed in position 5 is to cancel or modify the effect on the dipole moment of the molecule which is brought about by the substituent in position 2. This can have a desirable effect upon toxicity.

The unexpected and novel result of the introduction of one ortho substituent of the group F, Cl, Br while at the same time retaining both para substituents of the proper type is a retention of much of the toxicity to susceptible strains of a particular species and the limitation and ultimately the practical prevention of detoxication by "resistant" strains which then are equally as susceptible as the "susceptible" strain. Here the terms "susceptible" and "resistant" are used with reference to the action of the non-sterically hindered reference penticide.

It is of further interest to note that the ortho substituted analogs of DDT of the present invention are not only toxic in their own right but also have a synergistic action when used with DDT on DDT-resistant strains of houseflies.

More particularly, the compounds of the present invention may be described by the formula (V)

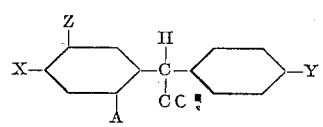

wherein X and Y are contactophore groups, A is a halogen having an atomic number below 36 and Z is hydrogen or a substituent capable of modifying the effect on the dipole moment of the molecule brought about by the introduction of substituent A into the molecule. Likewise, in this formula where X and Y are employed to designate the groups in the para positions of the respective benzene rings, they may be the same contactophore group or they may be different contactophore groups which fall within the definitions assigned to X and Y. In a preferred form of this invention, X, Y and Z in Formula V are selected from the group consisting of F, Cl, Br, $CH_3$ and $OCH_3$ whereas A is selected from the group consisting of F, Cl, and Br.

The effect on the $LD_{50}$ for susceptible and resistant houseflies of the introduction of one ortho substituent in DDT while retaining both para substituents is compared below with the effect of removing one para substituent and of removing one para substituent and placing an ortho substituent in the same ring:

(VI)

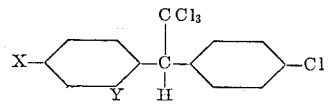

| X | Y | $LD_{50}$ (mg./fly) | |
|---|---|---|---|
| | | S-Strain (CSMA) | R-Strain (DDT-45) |
| Cl | H | 0.1 | >40 |
| H | H | 2.1 | >20 |
| H | Cl | 6.2 | ~20 |
| Cl | Cl | 0.3 | 0.6 |

That the isze of the ortho substituent has an effect upon toxicity and upon detoxification is apparent from the following table:

| | X | Y | $LD_{50}$ (mg./fly) | |
|---|---|---|---|---|
| | | | S-Strain (CSMA) | R-Strain (DDT-45) |
| p. 1 | Cl | H | 0.1 | >40 |
| p. 2 | Cl | F | 0.2 | 8.0 |
| | Cl | C | 0.3 | 0.6 |
| p. 3 | Cl | Br | 1.0 | 1.0 |

A highly DDT-resistant strain of housefly selected by Diazinon pressure showed susceptibility to insecticides, p. 2 and p. 3 above. The toxicity of p. 2 was ⅓ of that and p. 3 ½ of that shown by DDT to the susceptible strain from which said resistant strain was developed by multigeneration of Diazinon pressure.

The effectiveness of the present insecticides toward DDT-resistant flies is thought to be due to the fact that the DDT deactivating enzyme produced by those flies does not affect the present insecticide. Thus, for example, it has been found that the O-chloro-DDT and O-bromo-DDT are inert toward the action of the enzyme DDT-ase (dehydrochlorinase) and is the chief factor responsible for the toxicity of these substances to DDT-resistant strains.

The compounds of the present invention may be made by condensing an ortho substituted carbinol with a substituted benzene in accordance with the following equation wherein X and Y are contactophore groups, A is a halogen having an atomic number below 36, Z is hydrogen or a group capable of modifying the effect on the dipole moment brought about by the introduction of substituent A into the molecule and $l$, $m$ and $n$ have the value ascribed to them above:

(VII)

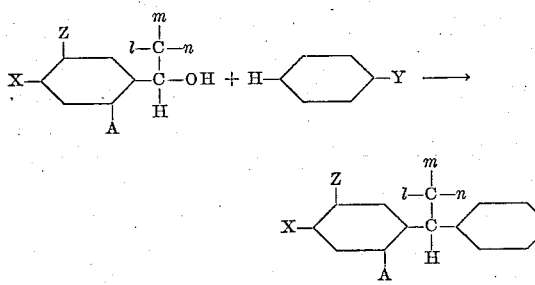

The above condensation is preferably carried out in the presence of a condensing or dehydrating agent. A mixture of concentrated sulfuric acid and fuming sulfuric acid may be used for this purpose. The tempearture at which this condensation reaction is effected may vary with the particular reactant involved. However, in the preferred form of this invention the condensation is effected at a temperature of between 60 and 70° C.

In a preferred form of this invention in the above Equation VII A is fluorine, chlorine or bromine; X and Y are fluorine, chlorine, bromine, methyl or methoxy and Z is hydrogen, fluorine, chlorine, bromine, methyl or methoxy. $l$, $m$ and $n$ in this aspect of the invention are preferably chlorine.

The following examples are further illustrative of the present invention and it will be understood that the invention is not limited thereto.

2-(4-CHLOROPHENYL)-2-(4-CHLORO-2-FLUOROPHENYL)-1,1,1-TRICHLOROETHANE

*5-chloro-2-iodonitrobenzene*

100 g. of 4-chloro-2-nitroaniline was dissolved in 500 ml. of acetic acid and 150 ml. of conc. sulfuric acid and cooled. This was added dropwise, with stirring, to a solution of 52 g. of powdered sodium nitrite in 450 ml. of conc. sulfuric acid, the temperature being kept below 15° with an ice bath. When addition was complete, the diazonium solution was transferred to a large dropping funnel and added slowly to a stirred solution of 180 g. of potassium iodide in 400 ml. of water contained in a 5 l., 3-necked flask. The temperature was kept below 20°. Stirring was continued for 5–7 hours and the mixture was allowed to stand overnight.

Two liters of water were added and the mixture was filtered. The solid was washed with water and dissolved in 800 ml. of ethanol, then poured into a solution of 100 g. of sodium thiosulfate in 2 liters of water. The solid was allowed to separate slowly while standing in the refrigerator overnight. Filtration afforded the desired product, M.P. 55–58°, yield 95–130 g.[1] A sample purified by recrystallization from ethanol-water melted sharply at 61°[2] Körner, Gazz. Chim. Ital., 328 (1875), reports 63.3°. The crude product proved to be satisfactory for use in the next step.

*5-chloro-2-iodoaniline*

95 g. of chloroiodonitrobenzene (crude) was dissolved in 400 ml. of methanol and 25 ml. of water. 30 g. of fine iron filings was placed in a 1 liter, three-necked flask fitted with stirrer and condenser and just covered with methanol. 12 ml. of conc. HCl and about half of the previously prepared solution was added. When the initial reaction subsided, the remainder of the solution was added, along with an additional 30 g. of iron. The mixture was refluxed, with stirring, overnight (16–20 hours).

The suspension was filtered and the filtrate treated with charcoal. 150 ml. of conc. HCl was added to the slightly colored solution and the mixture cooled for several hours. The almost colorless crystals of the hydrochloride were filtered and washed with ether. M.P. 135–137° (dec.); yield 78 g.

A sample of the pure amine was obtained by treating the hydrochloride with aqueous ammonia. M.P. 40–41°.

*4-chloro-2-fluoroiodobenzene*

88 g. of chloroiodoaniline hydrochloride was suspended in 150 ml. of 48% fluoboric acid. 100 g. of cracked ice was added and the mixture set in an ice bath. A cold solution of 23 g. of sodium nitrite in 60 ml. of water was added dropwise with stirring, keeping the temperature below 10°. Stirring was continued for 20 minutes after addition was complete. The mixture was filtered and the solid washed with 50 ml. of cold 5% fluoboric acid, 200 ml. of cold 1:1 methanol-ether and 200 ml. of cold ether. The almost white powder was dried in air. Yield 91 g.

Pyrolysis of the solid was carried out as soon as all traces of ether had vanished. The material was not desiccated. Pyrolysis was conducted in an 800 ml. round flask fitted with a West condenser and receiver. The receiver was a 3-necked flask immersed in ice and provided with an outlet tube for the resultant $BF_3$. Decomposition was effected with a free flame. The reaction was carried out very gently and slowly.[3] When dense fumes of $BF_3$ no longer appeared, the receiver, condenser and fittings were washed with ether and the washings, plus some additional ether were used to extract the residue in the reaction flask.[4] The clear extract was decanted from insoluble sludge, washed with 5% sodium hydroxide, sodium thiosulfate and water, then dried over calcium chloride.

Distillation yielded 44.5 g. of a slightly colored liquid, B.P. 95–100°/7–9 mm.[5] M.P. 15°.

Calculated for $C_6H_3ClFI$: C, 28.10; H, 1.17; Cl, 13.80; F, 7.42; I, 49.51. Found: C, 28.37; H, 1.38; Cl, 13.21; F, 6.92; I, 50.13.

*1-(4-chloro-2-fluorophenyl)-2,2,2-trichloroethanol*

A solution of 26 g. of 4-chloro-2-fluoroiodobenzene in 100 ml. of dry ether was added slowly to 2.8 g. of magnesium with stirring. The reaction began immediately and proceeded briskly. The mixture was refluxed for 30 minutes after addition was complete.

The reaction flask was immersed in an ice bath and 14.5 g. of anhydrous chloral in 30 ml. of ether was added dropwise. The mixture was stirred at room temperature for two hours after addition was complete. The product was decomposed with a mixture of 3 N HCl and ice. The ether layer was washed with carbonate, thiosulfate and dried over sodium sulfate.

Distillation yielded 11.5 g. of a very viscous, lightly colored liquid, B.P. 129–135°/1–2 mm.

Calculated for $C_8H_5Cl_4FO$: C, 34.55; H, 1.79; Cl, 51.05; F, 6.83. Found: C, 35.40; H, 2.50; Cl, 50.27; F, 6.44. $\lambda_{max}$ 2.8μ (alcohol); 8.3–8.5μ (C—F); 13.25μ ($CCl_3$); and 3.9μ (1,2,4-trisubstitution).

---

[1] See footnotes at end of specification.
[2] See footnotes at end of specification.
[3] See footnotes at end of specification.
[4] See footnotes at end of specification.
[5] See footnotes at end of specification.

2-(4-chlorophenyl)-2-(4-chloro-2-fluorophenyl)-1,1,1-trichloroethane 3 g. of the carbinol was added dropwise to a well stirred emulsion of 3 ml. of chlorobenzene, 10 ml. of conc. sulfuric acid and 4 ml. of 15% fuming sulfuric acid. The mixture was kept in a 60–70° water bath and stirred for 3–4 hours. (During one run the product solidified after one hour.) The dark liquid was then poured into ice and water and the residual thick oil washed by triturating with 75% alcohol.

It was found very difficult to crystallize the oil from the first run. Passing a pet. ether solution of the oil through an alumina column and collecting 5–10 ml. fractions afforded a solid in the sixth to eighth fractions. After this initial success, subsequent samples of oil crystallized readily from methanol-water. M.P. 81.5–82°; yield 2 g.

Calculated for $C_{14}H_8Cl_5F$: C, 45.14; H, 2.16; F, 5.10. Found: C, 45.09; H, 2.35; F, 5.07.

2-(2,4-DICHLOROPHENYL)-2-(p-CHLOROPHENYL)-1,1,1-TRICHLOROETHANE

1-(2,4-dichlorophenyl)-2,2,2-trichloroethanol

[A slight modification of the general procedure of Bergmann, Ginsberg and Lavie, J. Am. Chem. Soc., 72, 5012 (1950)]

87.5 g. of 2,4-dichlorobenzaldehyde was suspended in 150 ml.[6] of chloroform. 30 g. of KOH pellets were ground to a powder and added in small portions to the vigorously stirred mixture, care being taken to keep the alkali dry between additions.[7]

When about half of the alkali had been added and the mixture became warm, cooling was effected with an ice bath.[8] Reaction was allowed to continue for 30 minutes after addition was complete. The mixture was then poured into a solution of 25 ml. of conc. sulfuric acid in 300 ml. of water. The water layer was separated and extracted with fresh chloroform, then the organic layers combined, filtered[9] and washed with carbonate and dried over sodium sulfate. Distillation yielded 21 g. of a viscous, honey-like liquid, B.P. 140–145°/1 mm.

Calculated for $C_8H_5Cl_5O$: C, 32.66; H, 1.70. Found: C, 34.29; H, 2.01.

1-(2,4-dichlorophenyl)-1-(4-chlorophenyl)-2,2,2-trichloroethane

The same condensation procedure was used. The oil from the initial run was again purified with an alumina column and the resultant colorless oils crystallized from methanol. In subsequent runs, the unpurified oil crystallized directly from glacial acetic acid. M.P. 72–75.5°.

Calculated for $C_{14}H_8Cl_6$: C, 43.23; H, 2.07; Cl, 54.42. Found: C, 43.16; H, 2.34; Cl, 54.35.

2-(4-CHLOROPHENYL)-2-(2-BROMO-4-CHLOROPHENYL)-1,1,1-TRICHLOROETHANE

2-bromo-4-chloroiodobenzene 25 g. of 5-chloro-2-iodoaniline was dissolved in 250 ml. of glacial acetic acid.[10] This was added dropwise with cooling and stirring to 7 g. of sodium nitrite in 90 ml. of conc. sulfuric acid. The diazonium solution was then slowly added, with cooling and stirring, to 35 g. of cuprous bromide[11] in 90 ml. of 48% hydrobromic acid contained in a large three-necked flask. When addition was complete, the flask was immersed in a water bath (about 80°) and stirring continued for two hours. At the end of this period a dark sludge had separated. The mixture was poured into 1 liter of ice and water and, after standing for a short time, the supernatant decanted. The residue was extracted by boiling with 150 ml. of chloroform and filtering the unreacted CuBr. The supernatant was extracted with fresh chloroform and the combined organic layers washed with carbonate and thiosulfate, then dried over calcium chloride. Distillation yielded 15.5 g., B.P. 105–110°/2 mm. M.P. 27–28°. The product was light gold in color.

Calculated for $C_6H_3BrClI$: C, 22.68; H, 0.94; Br, 25.19; Cl, 11.18; I, 40.00. Found: C, 22.71; H, 1.20; Br, 24.82; Cl, 10.90; I, 39.68.

1-(2-bromo-4-chlorophenyl)-2,2,2-trichloroethanol 15 g. of bromochloroiodobenzene in 150 ml. of dry ether was slowly added to 1.3 g. of magnesium. The reaction began immediately upon slight heating. Gentle heating was found necessary to keep the reaction going at a brisk rate. Refluxing was continued for 15 minutes after addition was complete. The flask was then immersed in ice and 7 g. of chloral in 15 ml. of ether was slowly added. The mixture was then stirred at room temperature for three hours.

The product was decomposed with cold, dilute acid and extracted with ether. The ether was washed with carbonate and thiosulfate and dried over sodium sulfate. Distillation yielded 5 g. of a viscous liquid, B.P. 158–162°/1–2 mm.

An attempt was made to prepare the hemi-phthalate. Addition of ether to the reaction mixture produced an insoluble sludge. The ether solution was extracted as usual and a very small amount of solid obtained from the alkaline extract. This was found to be phthalic acid.

Condensation in the usual manner yielded an oil which would not crystallize. Purification by means of an alumina column gave a clear oil. This crystallized from hexane. M.P. 66–67°.

Calculated for $C_{14}H_8BrCl_5$: C, 38.75; H, 1.84; Br, 18.45; Cl, 40.94. Found: C, 38.82; H, 2.37; Br, 17.69; Cl, 40.55.

While the invention has been described with particular reference to specific embodiments, it is to be understood that it is not limited thereto, but is to be construed broadly and restricted solely by the scope of the appended claims.

What is claimed is:

1. A compound of formula

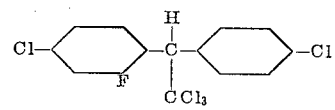

2. A compound of formula

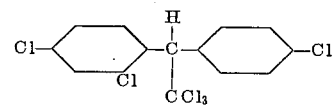

3. A compound of formula

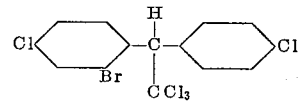

References Cited by the Examiner

UNITED STATES PATENTS

| | | | |
|---|---|---|---|
| 2,429,839 | 10/1947 | Miller | 167—30 |
| 2,609,402 | 9/1952 | Ladd | 260—649 |
| 2,711,384 | 6/1955 | Darley | 167—30 |
| 2,793,237 | 5/1957 | Gilbert et al. | 260—649 |

(Other references on following page)

---

[6] See footnotes at end of specification.
[7] See footnotes at end of specification.
[8] See footnotes at end of specification.
[9] See footnotes at end of specification.
[10] See footnotes at end of specification.
[11] See footnotes at end of specification.

FOREIGN PATENTS 597,091   1/1948   Great Britain.

OTHER REFERENCES

Cristol et al.: "Chemical and Engineering News," vol. 23, No. 2, pp. 2070–75 (1945).
Prill et al.: "Science," vol. 101 (1945), pp. 464–5.

LEON ZITVER, *Primary Examiner.*

ALPHONSO D. SULLIVAN, *Examiner.*

K. V. ROCKEY, J. W. WILLIAMS, S. H. BLECH, K. H. JOHNSON, *Assistant Examiners.*

NOTES

[1] Three runs were made with yields of 95, 120 and 130 g. The 130 g. yield was rather impure.
[2] All melting points are uncorrected.
[3] Rapid decomposition caused cleavage of the C—I bond, as evidenced by the evalution of iodine vapor.
[4] The slight miscibility of water in ether appeared to cause some difficulty. (A solid separated at various times during the extraction.) It is suggested that ether be replaced by chloroform.
[5] All pressure readings were taken by a simple manometer. The pressures are therefore not highly accurate.
[6] The aldehyde was not very soluble in chloroform. A larger volume (250–300 ml.) is suggested.
[7] The powdered KOH was kept in a closed jar and covered between additions.
[8] Bergmann et al. use the ice bath at the outset. This causes the reaction to proceed slowly initially, then take off rapidly.
[9] The solid removed by filtration, as well as some solid obtained when distilling, was shown to be 2,4-dichlorobenzaldehyde. This was obtained in considerable amount. A longer reaction period (2–3 hours), with cooling and sufficient dilution is suggested to increase the yield.
[10] Attempts to effect solution by addition of sulfuric acid resulted in separation of a solid.
[11] Prepared before use from copper sulfate, sodium bromide and sodium sulfite.